United States Patent
Gunnarsson et al.

(10) Patent No.: US 10,171,224 B2
(45) Date of Patent: Jan. 1, 2019

(54) METHOD AND ARRANGEMENT FOR RELAYING IN CASE OF EXTENSION AREAS HAVING UPLINK/DOWNLINK IMBALANCE

(75) Inventors: Fredrik Gunnarsson, Linköping (SE); Gunnar Mildh, Sollentuna (SE); Stefan Parkvall, Bromma (SE); Stefan Wager, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 291 days.

(21) Appl. No.: 14/372,400

(22) PCT Filed: Jan. 16, 2012

(86) PCT No.: PCT/SE2012/050034
§ 371 (c)(1),
(2), (4) Date: Jul. 15, 2014

(87) PCT Pub. No.: WO2013/109172
PCT Pub. Date: Jul. 25, 2013

(65) Prior Publication Data
US 2014/0355568 A1    Dec. 4, 2014

(51) Int. Cl.
*H04L 5/00* (2006.01)
*H04W 36/00* (2009.01)
(Continued)

(52) U.S. Cl.
CPC .......... *H04L 5/0073* (2013.01); *H04L 5/0032* (2013.01); *H04W 16/30* (2013.01);
(Continued)

(58) Field of Classification Search
CPC ....... H04L 27/02; H04L 27/04; H04L 27/183; H04L 27/2604; H04L 27/3488;
(Continued)

(56) References Cited

U.S. PATENT DOCUMENTS 5,541,979 A * 7/1996 Leslie .................. H04B 7/2606
  370/337
7,760,699 B1 * 7/2010 Malik ..................... H04L 1/005
  370/320
(Continued)

FOREIGN PATENT DOCUMENTS

WO  2007053948 A1  5/2007
WO  2007053949 A1  5/2007

OTHER PUBLICATIONS

3GPP TS 36.331 v8.2.0, "3GPP TSG-RAN E-UTRAN RRC Protocol Specification", v8.2.0, May 2008.*
(Continued)

*Primary Examiner* — Jeffrey M Rutkowski
*Assistant Examiner* — Jonathan Wood
(74) *Attorney, Agent, or Firm* — Patent Portfolio Builders, PLLC (57) ABSTRACT

Underlay network node and macro base station and methods therein for enabling avoidance of interference in a cell extension area associated with an uplink/downlink imbalance. The underlay network node is assumed to be associated with a cell area A, and a cell extension area B, where the cell extension area B has an uplink/downlink imbalance in relation to a neighboring base station and the network node. The method in the underlay network node involves serving a UE in both uplink and downlink when the UE is located in cell area A. The method further involves serving a UE only in the uplink when the UE is located in cell extension area B, thus enabling avoidance of interference related to communication of a UE located in said cell extension area B.

30 Claims, 10 Drawing Sheets (51) Int. Cl.
*H04W 72/08* (2009.01)
*H04W 16/30* (2009.01)
*H04W 16/32* (2009.01)
*H04W 84/04* (2009.01)
*H04W 88/08* (2009.01)

(52) U.S. Cl.
CPC ..... *H04W 36/0094* (2013.01); *H04W 72/085* (2013.01); *H04W 16/32* (2013.01); *H04W 84/045* (2013.01); *H04W 84/047* (2013.01); *H04W 88/08* (2013.01)

(58) Field of Classification Search
CPC ..... H04L 1/0041; H04L 1/0057; H04L 1/006; H04L 1/0065; H04L 1/007; H04L 5/0073; H04W 84/045; H04W 24/00; H04W 24/02; H04W 24/08; H04W 24/10; H04W 72/0406; H04W 72/042; H04W 72/082; H04W 72/1252; H04W 16/00; H04W 16/18; H04W 16/26; H04W 16/30; H04W 16/32
See application file for complete search history.

(56) References Cited

U.S. PATENT DOCUMENTS

| | | | | |
|---|---|---|---|---|
| 2011/0190005 | A1* | 8/2011 | Cheon | H04W 24/00 455/456.1 |
| 2011/0319090 | A1* | 12/2011 | Vajapeyam | H04W 24/02 455/450 |
| 2012/0087247 | A1* | 4/2012 | Min | H04W 36/0083 370/237 |
| 2012/0087266 | A1* | 4/2012 | Vajapeyam | H04J 11/0056 370/252 |
| 2013/0029669 | A1* | 1/2013 | Boudreau | H04W 16/28 455/444 |
| 2013/0058244 | A1* | 3/2013 | Huang | H04W 24/10 370/252 |
| 2013/0065558 | A1* | 3/2013 | O'Neil | H04W 84/045 455/411 |
| 2013/0065599 | A1* | 3/2013 | Chan | H04W 16/18 455/446 |
| 2013/0084910 | A1* | 4/2013 | Suzuki | H04W 24/02 455/515 |
| 2013/0121191 | A1* | 5/2013 | Song | H04J 11/0056 370/252 |
| 2013/0136015 | A1* | 5/2013 | Ojala | H04L 5/001 370/252 |
| 2013/0176952 | A1* | 7/2013 | Shin | H04L 5/001 370/329 |
| 2013/0229953 | A1* | 9/2013 | Nam | H04W 72/0426 370/280 |
| 2014/0105224 | A1* | 4/2014 | Frederiksen | H04L 1/1887 370/465 |
| 2014/0140323 | A1* | 5/2014 | Son | H04W 36/0055 370/331 |
| 2014/0293952 | A1* | 10/2014 | Maniatis | H04W 72/1226 370/329 |
| 2015/0131536 | A1* | 5/2015 | Kaur | H04L 5/001 370/329 |

OTHER PUBLICATIONS

Hu et al. "Mobile Association in a Heterogeneous Network." IEEE 2010. 1-6.
Unknown, Author, "Enhancements for Uplink Power Control", Ericsson, ST-Ericsson, 3GPP TSG RAN WG1 Meeting #66bis, R1-112927, Zhuhai, China, Oct. 10-14, 2011, 1-5.
Unknown, Author, "Performance Analysis of UE Association in a Type-II relay network", Research in Motion UK Limited, 3GPP TSG RAN WG1 Meeting #59, R1-094462, Jeju, Korea, Nov. 9-13, 2009, 1-5.

* cited by examiner

High traffic area/Hot Spot

Figure 1a (prior art)

Macro cell  Femto cell
Pico cell  Relay

1:1 Second BS (Base Station) configuration enter
1:2 Second BS configuration leave
2:1 First BS configuration enter
2:2 First BS configuration leave

Figure 5a

1:1 First NN (Network Node) configuration enter
1:2 First NN configuration leave
2:1 Second NN configuration enter
2:2 Second NN configuration leave

METHOD AND ARRANGEMENT FOR RELAYING IN CASE OF EXTENSION AREAS HAVING UPLINK/DOWNLINK IMBALANCE

TECHNICAL FIELD

The invention relates generally to relaying in cellular communication systems, and in particular to a method and arrangement for supporting the same.

BACKGROUND

Figure 1A:
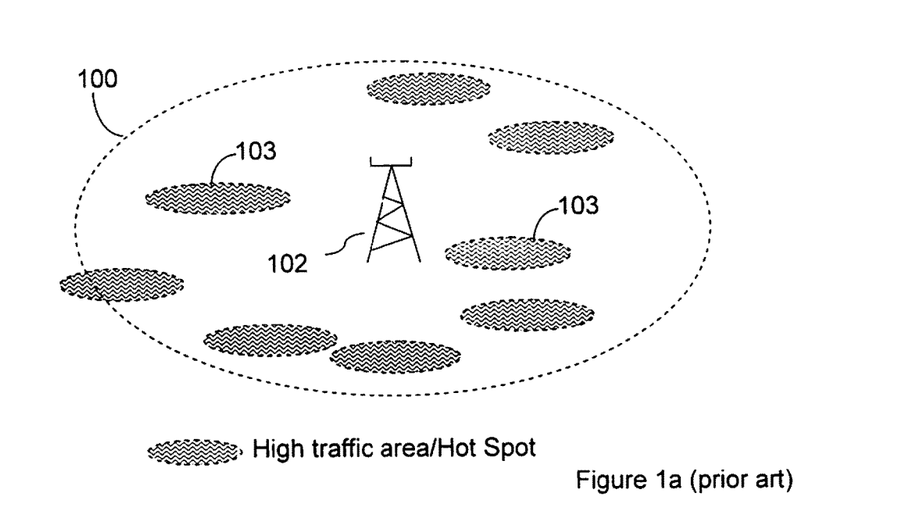
FIG. 1a is a schematic view showing a cell comprising areas with high traffic, according to the prior art.

In a cellular network, there may be areas with "high traffic", i.e. a high concentration of users. An exemplifying cell 100 comprising areas 103 with a high concentration of users is illustrated in FIG. 1a. In such high traffic areas 103 it may be desired to deploy additional capacity in order e.g. to keep the user satisfaction. Capacity could be added in the form of an additional macro base station, generating/serving a cell which covers one or more of the area(s) in need of extra capacity. Capacity could also be added in the form of additional nodes with lower output power, as compared to a macro base station, and thus covering a relatively smaller area, to which the desired capacity boost is concentrated.

There may also be areas, e.g. within a macro cell, with unfavorable radio conditions or "bad coverage", where there may be a need for coverage extension. One way to achieve a coverage extension is to deploy an additional node, e.g. a node with a low output power, as compared to the macro node, which concentrates the coverage boost to a relatively small area, e.g. where it is most needed.

One argument for choosing nodes with lower output power than the macro node for increasing capacity or coverage as in the above cases is that the impact on the macro nodes/network can be minimized. That is, by that the interference to a macro node, with a coverage which at least partially overlaps the coverage of the "added" lower output power node, may be limited to a relatively small area.

Figure 1B:
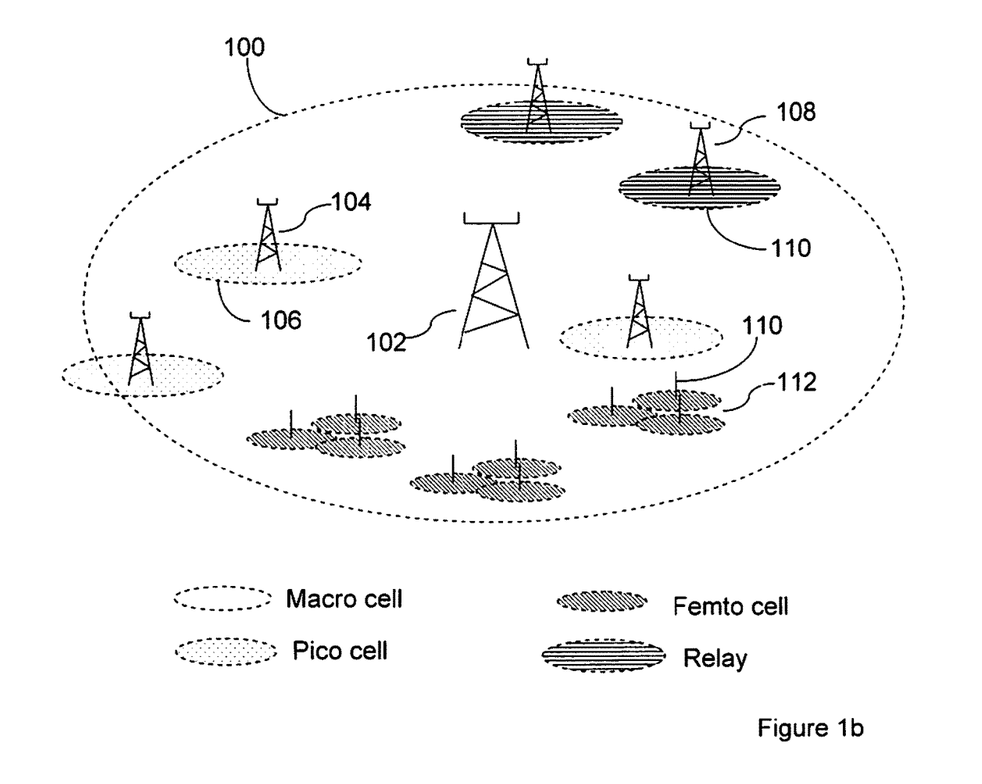
FIG. 1b is a schematic view showing an example of a constellation of different cells in a cellular communication system, according to the prior art.

FIG. 1b illustrates a macro base station 102, which provides a wide area coverage 100 (also called macro cell). FIG. 1b also shows examples of low power nodes that are deployed to provide small area capacity/coverage. In this example, pico base stations 104, relays 108 and home base stations 110 (femto cells) are shown. A pico base station can either be similar to a macro base station, but typically with more limited coverage, for example, having a lower max transmission power, or, be a remote radio unit connected to a main unit. A common term for such pico/relay/femto cells is "underlay cells", served by "underlay nodes". This type of network deployments are typically referred to as: "Heterogeneous Networks", "multilayer networks" or shortly "Het-Nets".

Underlay cells typically operate at lower reference (pilot/perch) signal powers, as compared to macro cells. This means that if the cell selections as well as mobility decisions are based on received reference signal strengths, the downlink cell border will be located closer to the underlay node than to the macro node/base station. If the uplink sensitivity for all cells is similar, or if the difference in uplink sensitivity is not equivalent to the difference in reference (pilot/perch) signal powers, then the uplink cell border will be different from the downlink cell border.

Figure 2:
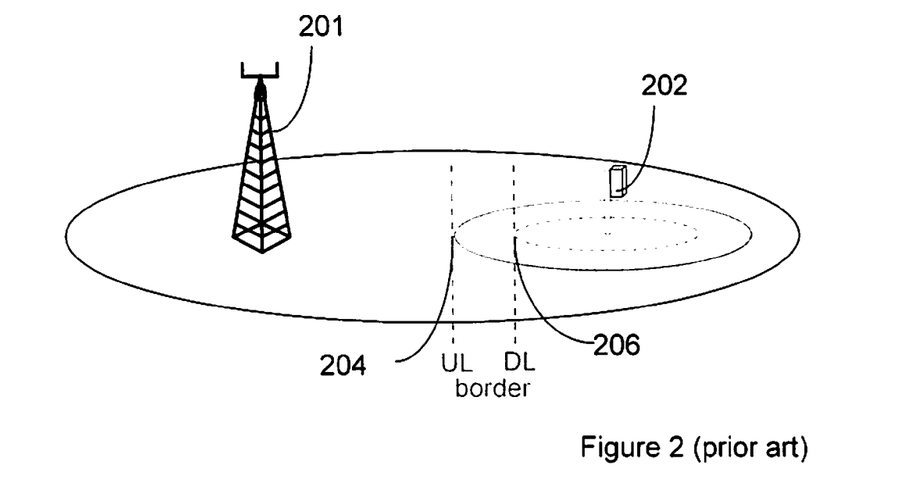
FIG. 2 is a schematic view showing an example of an area with an uplink/downlink imbalance, according to the prior art.

FIG. 2 illustrates a scenario where the uplink 204 and downlink 206 cell borders are separated. A situation where the UL and DL borders are separated may be referred to as an uplink/downlink (or downlink/uplink) imbalance in the area between the separated borders. This means that a UE in the area between the separated borders will have a better uplink connection to the underlay node, but because of the stronger DL transmit power of the macro node, it will receive a stronger DL signal from the macro node. The situation of uplink/downlink imbalance is not limited to macro cell/underlay cell combinations, but may arise also between macro cells and in locations with unfavorable radio conditions, e.g. in urban environments. An area associated with uplink/downlink imbalance may be referred to as a power imbalance area.

Referring to the example illustrated in FIG. 2, a first UE served by the macro node 201 may cause significant uplink interference to the underlay node 202 if located in an area relatively close to the underlay node. In fact, if located in the area with uplink/downlink imbalance, said UE may even have the best uplink to the underlay node/cell, but might nonetheless not have detected the underlay cell reference signal.

One way to relieve this situation of significant interference to the underlay node is to consider an underlay cell range expansions by considering offsets in the cell selection and/or mobility decisions. Thereby, potentially interfering UEs served by the macro node will be at a longer distance away from the underlay node, and thereby induce less interference to the underlay node. However, this also means that some UEs served by the underlay node can be subjected to critical interference from the macro node in the downlink.

Concerning relays, relaying support was added in the Rel-10 version of 3GPP LTE specification. The relay solution described in Rel-10 is a so-called "layer 3 relay", which means that all radio protocols (layers 1-3) are terminated in the Relay Node (RN). UEs connect to the RN over standard Uu interface, meaning that backwards compatibility with Rel-8 UEs is achieved. From a UE perspective, the RN looks like an ordinary eNB. The RN has no fixed backhaul, but connects wirelessly to a donor cell using the Un interface. The donor cell is controlled by a donor eNB and is based on Uu protocols, with some modifications. The donor eNB also serves UEs connected directly to the donor eNB.

So-called "inband relays" operate in the same frequencies as the macro layer (i.e. same as the donor node), which implies that the same frequency range is used on the access link and backhaul link. One issue with these relays is the uplink/downlink imbalance problem, which comes from the fact that the relay uses a lower transmit power than the macro base stations, as described above and illustrated in FIG. 2. Because of its lower transmit power, the size of the relay cell, when measured based on downlink Reference Symbol Received Power (RSRP), is smaller than the macro cell. Still, when considering uplink transmissions, UEs connected to the macro cell and located close to the relay cell may cause interference to UEs connected to the relay cell, as previously mentioned.

One way to handle the uplink/downlink imbalance problem described above is to base the cell selection e.g. on UE measured pathloss, instead of RSRP. In that case, the relay cell size is effectively increased, so that all UEs that have a better uplink to the relay connect to it. Such an increase of a cell size may be referred to as a cell range extension. The cell area gained or added by such a cell range extension may be referred to as a cell extension area. Alternatively, an offset to the RSRP measurement can be used to increase the cell size of the relay cell. The cell extension area will, however, be a power imbalance area associated with uplink/downlink imbalance. Thus, users located in the cell extension area in an increased-size relay cell will suffer from downlink interference from the macro eNB transmitting at higher power than the relay node. This situation needs to be solved by coordinating downlink transmissions between the macro and the relay cells in either frequency or time domain. Solutions for this were introduced in Rel-10, e.g. Carrier Aggregation can be used in frequency domain, and Almost Blank Subframes in time domain.

However, these solutions have their drawbacks. For example, the creating of Almost Blank Subframes reduces macro DL performance. In order to be efficient, coordinating the resources should be quick and adapted to instantaneous traffic load in the different cells. Such coordination requires quick and reliable communication between networking nodes.

SUMMARY

As an alternative to the solutions described above, this disclosure covers the introduction of a dual mode Relay Node. "Dual mode" refers to the way that the relay operates for different UEs. The two modes are explained below 1. For UEs close to the relay, that measure stronger RSRP from the relay as compared to the macro base station, the relay will act as a RN according e.g. to 3GPP Rel-10 specifications.
2. UEs that are located in a cell extension area, where the UEs measure a stronger RSRP from the macro base station (as compared to the RSRP from the relay) but their UL pathloss is better to the relay (as compared to the pathloss to the base station), will remain RRC (Radio Resource Control) connected (DL) to the macro base station, but in the UL, the relay may act as a layer 2 uplink only relay, boosting the UL bitrate between the UE and the macro base station and at the same time reducing the UL interference in the relay cell.

According to a first aspect, a method is provided in a network node. The network node is assumed to be associated with a cell area A, and a cell extension area B, where the cell extension area B has an uplink/downlink imbalance in relation to a neighboring base station and the network node. The method comprises serving a UE in both uplink and downlink when the UE is located in cell area A. The method further comprises serving a UE only in the uplink when the UE is located in cell extension area B, thus enabling avoidance of interference related to communication of a UE located in said cell extension area B.

According to a second aspect, a network node is provided. The network node is operable to be associated with a cell area A, and a cell extension area B, where cell extension area B has an uplink/downlink imbalance in relation to a neighboring base station. The network node comprises processing circuitry being configured to serve a UE in both uplink and downlink when the UE is located in cell area A. The processing circuitry is further configured to serve a UE only in the uplink when the UE is located in cell extension area B, thus enabling avoidance of interference related to communication of a UE located in said cell extension area B.

According to a third aspect, a method is provided in an base station associated with a cell area C. The base station is assumed to have a neighbor node, which is associated with a cell area A and a cell extension area B, where cell extension area B has an uplink/downlink imbalance in relation to the neighboring network node and the base station. The method comprises serving (808) a UE only in the downlink when the UE is located in the cell extension area B associated with the neighboring node, thus enabling avoidance of interference related to communication of a UE located in said cell extension area B According to a fourth aspect, a base station is provided. The base station is operable to be associated with a cell area C. The base station is further operable to have a neighboring network node, which is associated with a cell area A and a cell extension area B, where the cell extension area B has an uplink/downlink imbalance in relation to the neighboring network node and the base station. The base station comprises processing circuitry configured to serve a UE only in the downlink when the UE is located in the cell extension area B associated with the neighboring network node, thus enabling avoidance of interference related to communication of a UE located in said cell extension area B.

The methods and nodes described above may be used for reducing and/or avoiding uplink interference in the relay cell, and further for avoiding downlink interference in the cell extension area.

The methods and nodes described above may be implemented in different embodiments. For example, a set of event measurement conditions could be signaled to the UE, causing the UE to indicate, e.g. to send an event measurement report to the network node when an event measurement condition is fulfilled. The respective event measurement conditions are assumed to be related to entering or leaving the cell extension area B. The network node and/or the base station could then determine whether the UE is located in cell extension area B based on an indicator received from the UE. The indicator may be e.g. an event measurement report and/or a handover request. Alternatively, or in addition, it could be determined whether a UE is located in cell extension area B based on an indicator received from the neighboring base station or network node.

The network node may be operable to operate at a lower transmit power than the neighboring base station. The network node may be a relay node associated with the neighboring base station or another type of underlay node, such as a so-called pico or femto node. The base station may be an eNB e.g. in an LTE-type network or system.

The embodiments above have mainly been described in terms of a method. However, the description above is also intended to embrace embodiments of the network node and base station, configured to enable the performance of the above described features. The different features of the exemplary embodiments above may be combined in different ways according to need, requirements or preference.

BRIEF DESCRIPTION OF THE DRAWINGS

The invention will now be described in more detail by means of exemplifying embodiments and with reference to the accompanying drawings, in which.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions.

The realization for the first mode, i.e. which UEs that connect both UL and DL to the RN is straightforward and according to current specifications, e.g. LTE Rel-10. The UE measures RSRP of neighboring cells, and when a handover is triggered to the RN cell, the UE sends a measurement report to the source eNB, which triggers the handover procedure.

Realization of the second mode, i.e. UEs that connect only UL through the RN will be described in the following. As mentioned before, UEs in a cell extension area measure a stronger RSRP to the macro base station, while still having lower UL pathloss to the RN (uplink/downlink imbalance). This is due to the power difference between the macro base station and the low power RN. In the UL however, the UE transmit power is the same, which means that UEs that are in the cell extension area, but that are still connected to macro base station will cause interference to the RN cell. This may still be the case even though the uplink sensitivity of the macro node and the RN might be different.

In such a cell extension area it would thus be advantageous if the UL would be routed via the RN, thus taking the full advantage of the lower pathloss of the RN node, instead of causing interference to the same. This requires that the UL scheduling between the macro base station and the RN must be coordinated, since the macro UEs receive the scheduling grants from the macro base station. The cell extension area may be the whole area associated with uplink/downlink imbalance in a cell (the area between the UL and DL borders cf. FIG. 2), or a part/subsection of said area.

One central part of radio resource management in wireless networks is mobility. In 3GPP LTE, UE measurement reports of received downlink pilot power strengths (of so-called "measurement objects") are used for intra-frequency mobility. In particular, the so-called Event A3 (Neighbor cell becomes "offset value" better than serving cell) specifies [3GPP TS 36.331] that the UE shall:

consider the entering condition for this event to be satisfied when condition A3-1, as specified below, is fulfilled;

consider the leaving condition for this event to be satisfied when condition A3-2, as specified below, is fulfilled;

Inequality A3-1 (Entering Condition):

$$Mn+Ofn+Ocn-Hys>Mp+Ofp+Ocp+\text{Off}$$

Inequality A3-2 (Leaving Condition):

$$Mn+Ofn+Ocn+Hys<Mp+Ofp+Ocp+\text{Off}$$

The variables in the formula are defined as follows:

Mn is the measurement result of the neighbouring cell, not taking into account any offsets.

Ofn is the frequency specific offset of the frequency of the neighbour cell (i.e. offsetFreq as defined within measObjectEUTRA corresponding to the frequency of the neighbour cell).

Ocn is the cell specific offset of the neighbour cell (i.e. cellIndividualOffset as defined within measObjectEUTRA corresponding to the frequency of the neighbour cell), and set to zero if not configured for the neighbour cell.

Mp is the measurement result of the PCell, not taking into account any offsets.

Ofp is the frequency specific offset of the primary frequency (i.e. offsetFreq as defined within measObjectEUTRA corresponding to the primary frequency).

Ocp is the cell specific offset of the PCell (i.e. cellIndividualOffset as defined within measObjectEUTRA corresponding to the primary frequency), and is set to zero if not configured for the PCell.

Hys is the hysteresis parameter for this event (i.e. hysteresis as defined within reportConfigEUTRA for this event).

Off is the offset parameter for this event (i.e. a3-Offset as defined within reportConfigEUTRA for this event).

Mn, Mp are expressed in dBm in case of RSRP, or in dB in case of RSRQ.

where Ofn, Ocn, Ofp, Ocp, Hys, Off are expressed in dB.

Figure 4A:
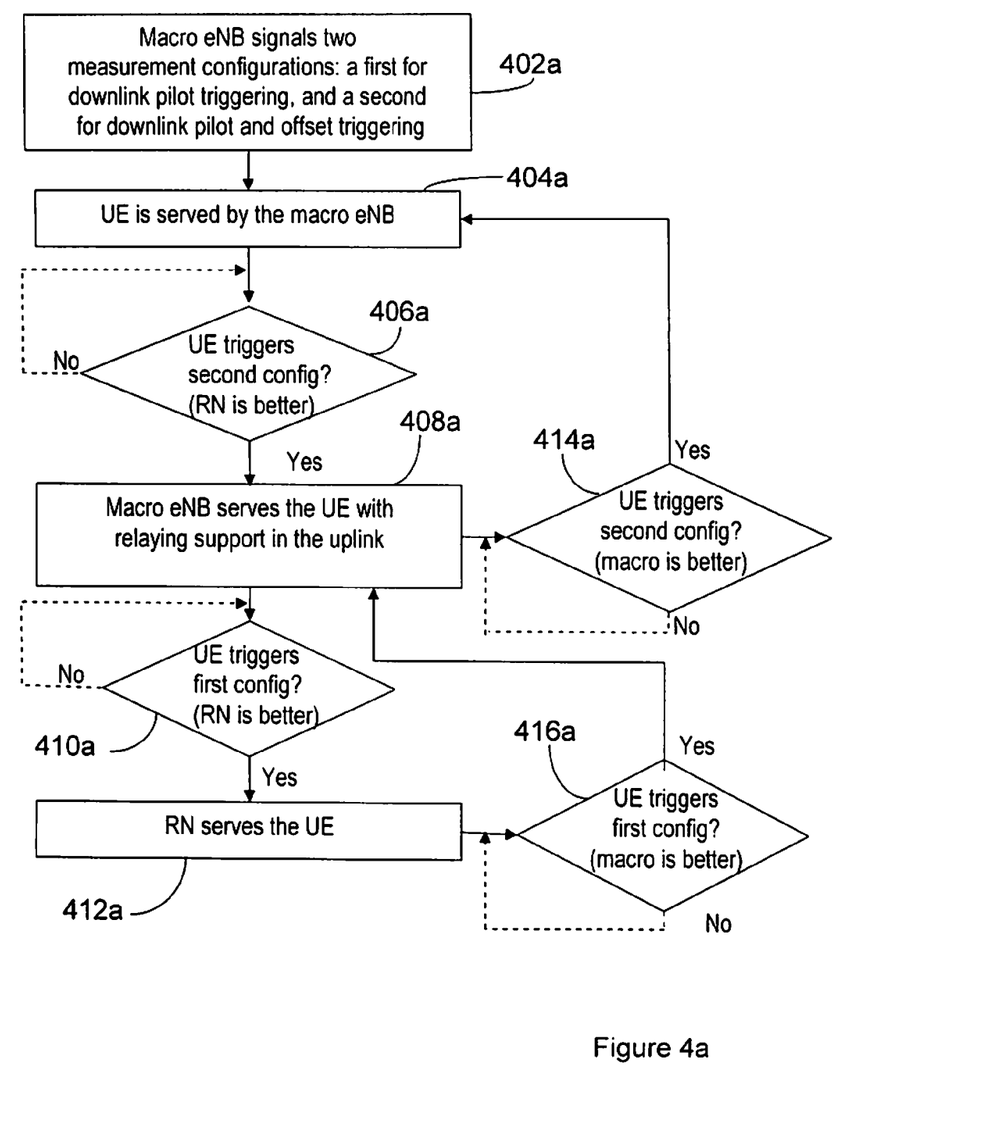
FIG. 4a is a flow chart showing transitions between different modes, starting in a situation where a UE is served in both uplink and downlink by a macro node, according to an exemplifying embodiment.

FIG. 4a describes how radio resource control measurement triggering in the UE can be used to transit between the phases or modes of different service when the UE starts by being served by a macro base station 404a and moves towards the RN. In one embodiment, it is based on two measurement configurations realizing event A3 as defined above. Yet specific, this generalizes directly to mechanisms where cell-specific offsets can be considered.

First Measurement Configuration—without Range Expansion Offsets

Figure 3:
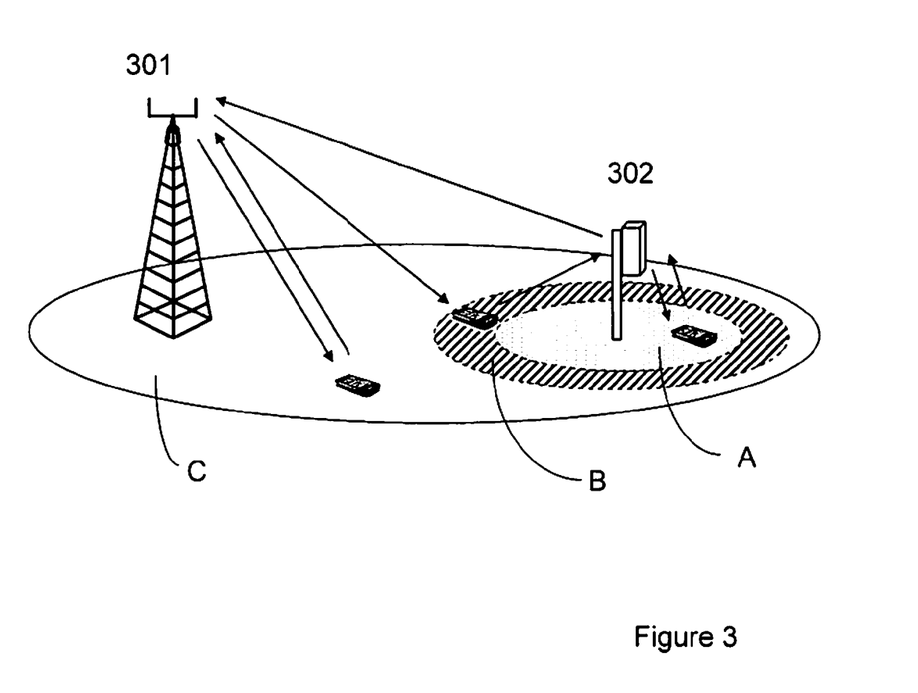
FIG. 3 is a schematic view showing a relay/underlay node 302 and related cell area A and cell extension area B, according to an exemplifying embodiment.

The first measurement configuration relates to conditions for entering and leaving the inner cell area where a UE is served in both uplink and downlink by the underlay node, c.f. cell area A in FIG. 3.

Inequality A3-1 (Entering Condition)

$$RSRPn-Hys>RSRPp+\text{Off}$$

Inequality A3-2 (Leaving Condition)

$$RSRPn+Hys<RSRPp+\text{Off}$$

Where RSRPn and RSRPp are received downlink pilot power strength in the neighbor cell and the serving cell respectively.

Second Measurement Configuration—with Range Expansion Offsets

The second measurement configuration relates to conditions for entering and leaving a cell extension area, where a UE is served in uplink by an underlay node, and in downlink by a macro node, cf. area B in FIG. 3. Assume that the relay/underlay node range is expanded by Δ dB, and that the serving cell is the macro base station, then (Ocn−Ocp)=Δ.

Inequality A3-1 (Entering Condition)

$$RSRPn-Hys+(Ocn-Ocp)>RSRPp+\text{Off}$$

Inequality A3-2 (Leaving Condition)

$$RSRPn+Hys+(Ocn-Ocp)<RSRPp+\text{Off}$$

where RSRPn and RSRPp are received downlink pilot power strength in the neighbor cell and the serving cell respectively, and hys and off are configurable parameters.

Figure 4B:
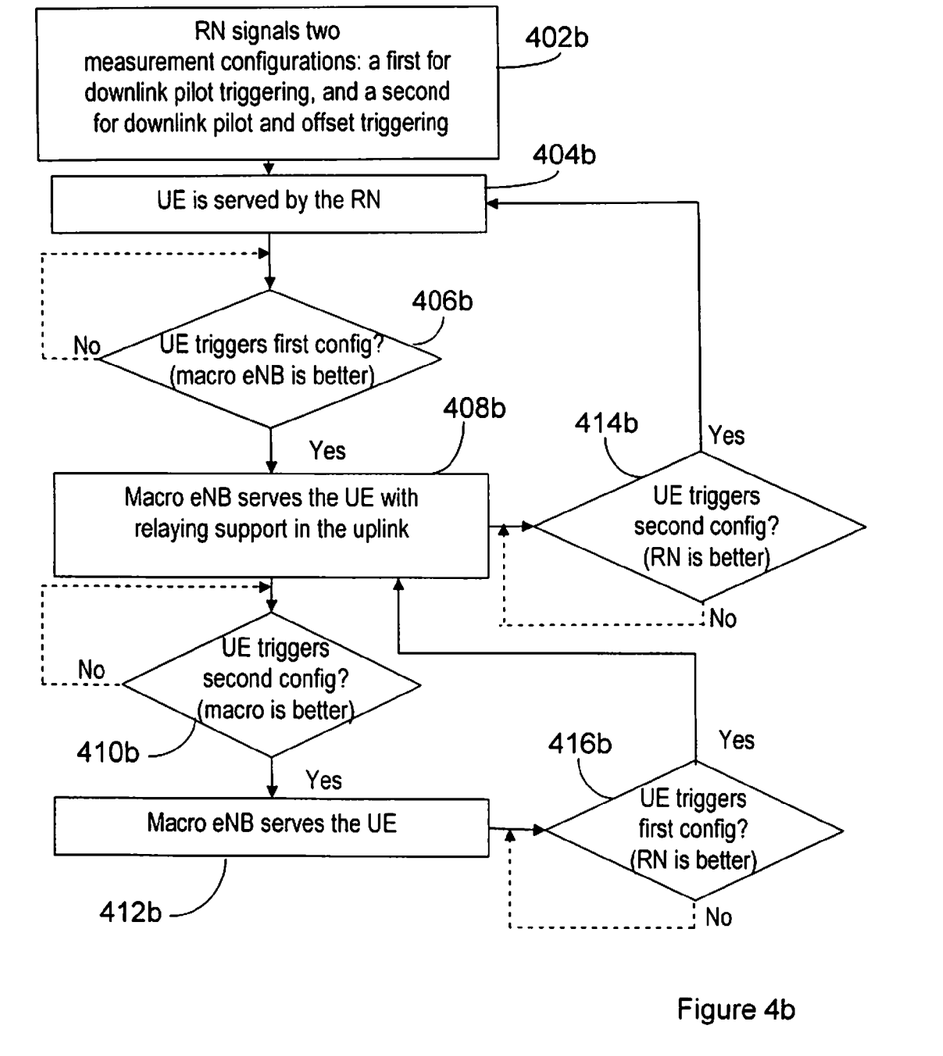
FIG. 4b is a flow chart showing transitions between different modes, starting in a situation where a UE is served in both uplink and downlink by an underlay network node, according to an exemplifying embodiment.

FIG. 4b provides a flow chart similar to the one in FIG. 4a, but where the UE instead moves from pure RN coverage 404b to pure macro base station coverage 412b. Then the following changes to the second measurement configuration apply:

Assume that the relay node range is expanded by Δ dB, and that the serving cell is the relay node, then (Ocn−Ocp)=−Δ.

Inequality A3-1 (Entering Condition)

$$RSRPn-Hys+(Ocn-Ocp)>RSRPp+\text{Off}$$

Inequality A3-2 (Leaving Condition)

$$RSRPn+Hys+(Ocn-Ocp)<RSRPp+\text{Off}$$

Figure 5A:
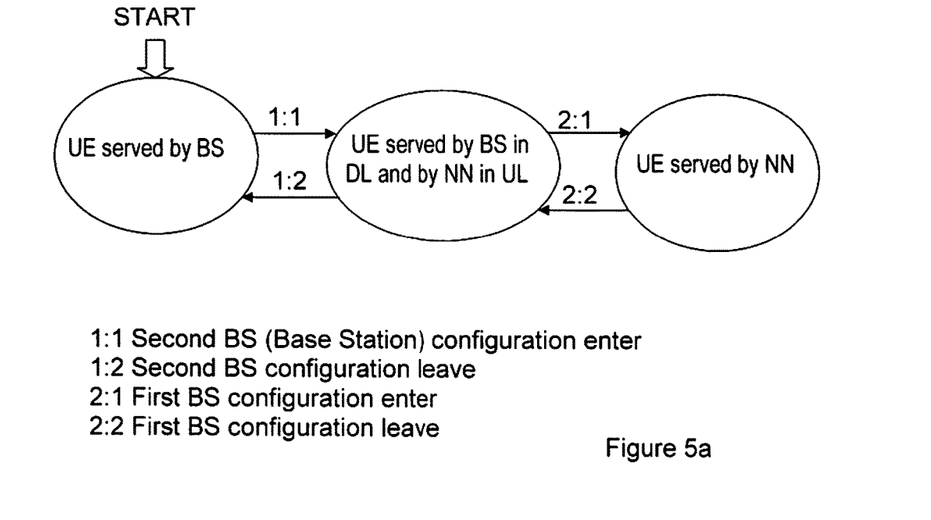
FIG. 5a is a state diagram showing the same transitions between different modes as in FIG. 4a, according to an exemplifying embodiment.
Figure 5B:
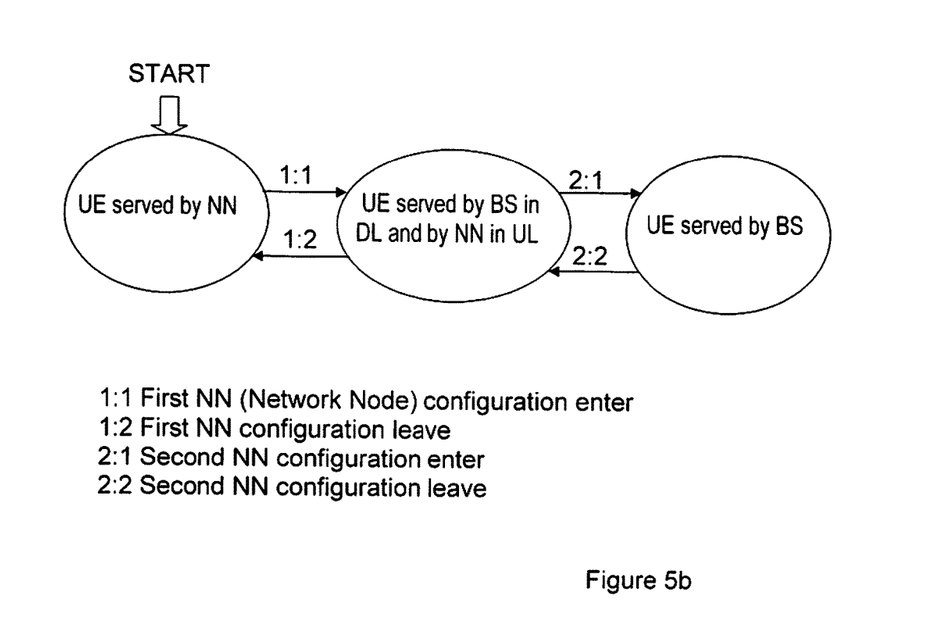
FIG. 5b is a state diagram showing the same transitions between different modes as in FIG. 4b, according to an exemplifying embodiment.

FIGS. 5a and 5b illustrate the same state transitions as FIGS. 4a and 4b in a slightly different way, i.e. as a state diagram. The UE is transferred between the states when it reports, based on the measurement configurations provided by its serving node, the fulfillment of a measurement configuration condition or inequality. In the figures, it is indicated which condition that is fulfilled and which of the macro base station and the underlay network node/RN that has provided the measurement configurations.

Figure 6:
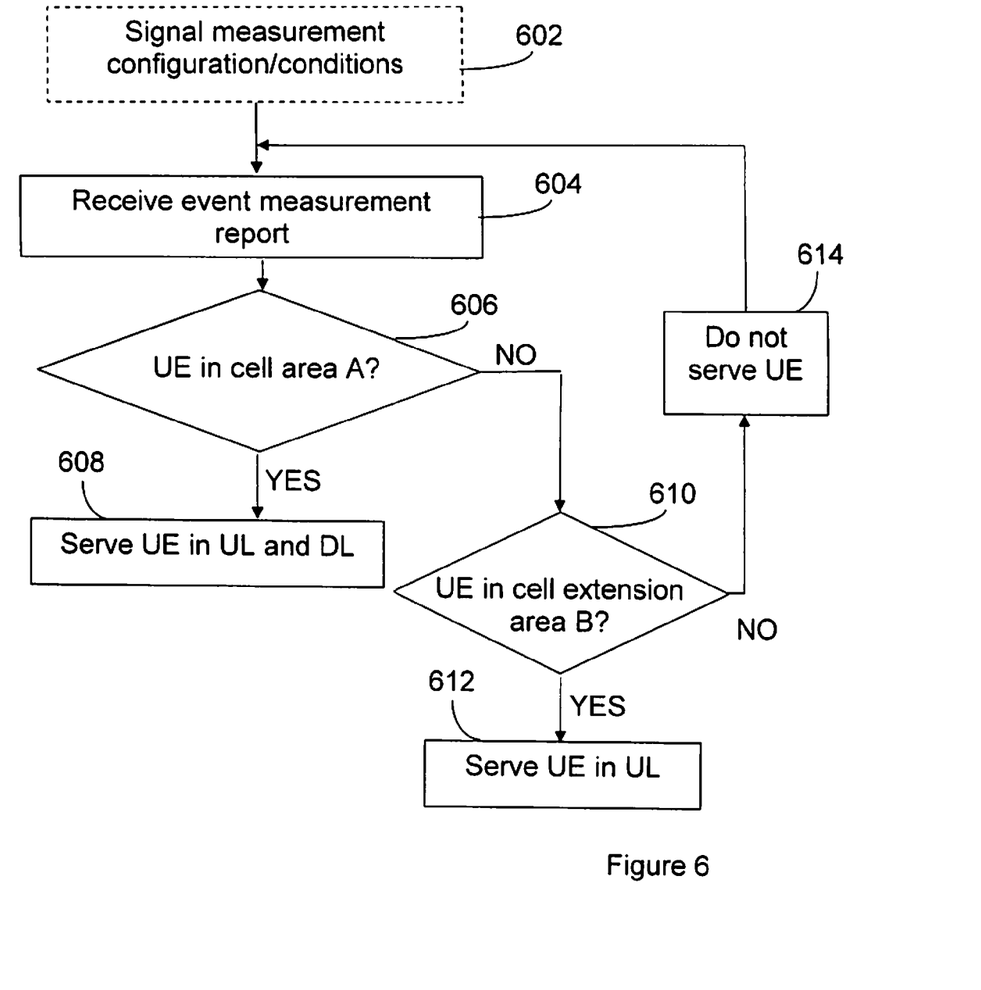
FIG. 6 is a flow chart illustrating a procedure in a relay/underlay node, according to an exemplifying embodiment.

Exemplifying Procedure, FIG. 6

FIG. 6 illustrates actions of a procedure in a network node, e.g. a relay or pico node, according to an exemplifying embodiment. The network node is assumed to be associated with a cell area A and a cell extension area B (having an uplink/downlink imbalance in relation to a neighboring macro base station). In a specific embodiment, the network node is a so-called underlay node to a macro node/base station.

A measurement configuration may be signaled to UEs served by the network node in an action 602. The measurement configuration comprises measurement conditions, which should trigger an indication, such as an event measurement report, from the UE when fulfilled. Each measurement condition may have a measurement identity, which could be used as an indicator to indicate which condition that is fulfilled. An indication/indicator may be received from a UE in an action 604. Based on the indication, it is determined e.g. in actions 606 and 610, whether the UE is located in cell area A or in cell extension area B.

When it is determined e.g. in action 606 that the UE is located in cell area A, the UE is served in uplink and downlink in an action 608. If it instead is determined in an action 610 that the UE is located in cell extension area B, the UE is served in uplink (but not in downlink) in an action 612. This enables avoidance of interference related to communication of the UE (located in said cell extension area B). If it is determined that the UE is neither located in cell area A nor cell extension area B, the UE should not be served by the network node, which is illustrated by an action 614 in FIG. 6. This may involve e.g. handing over the UE to a neighbor macro node.

Figure 7:
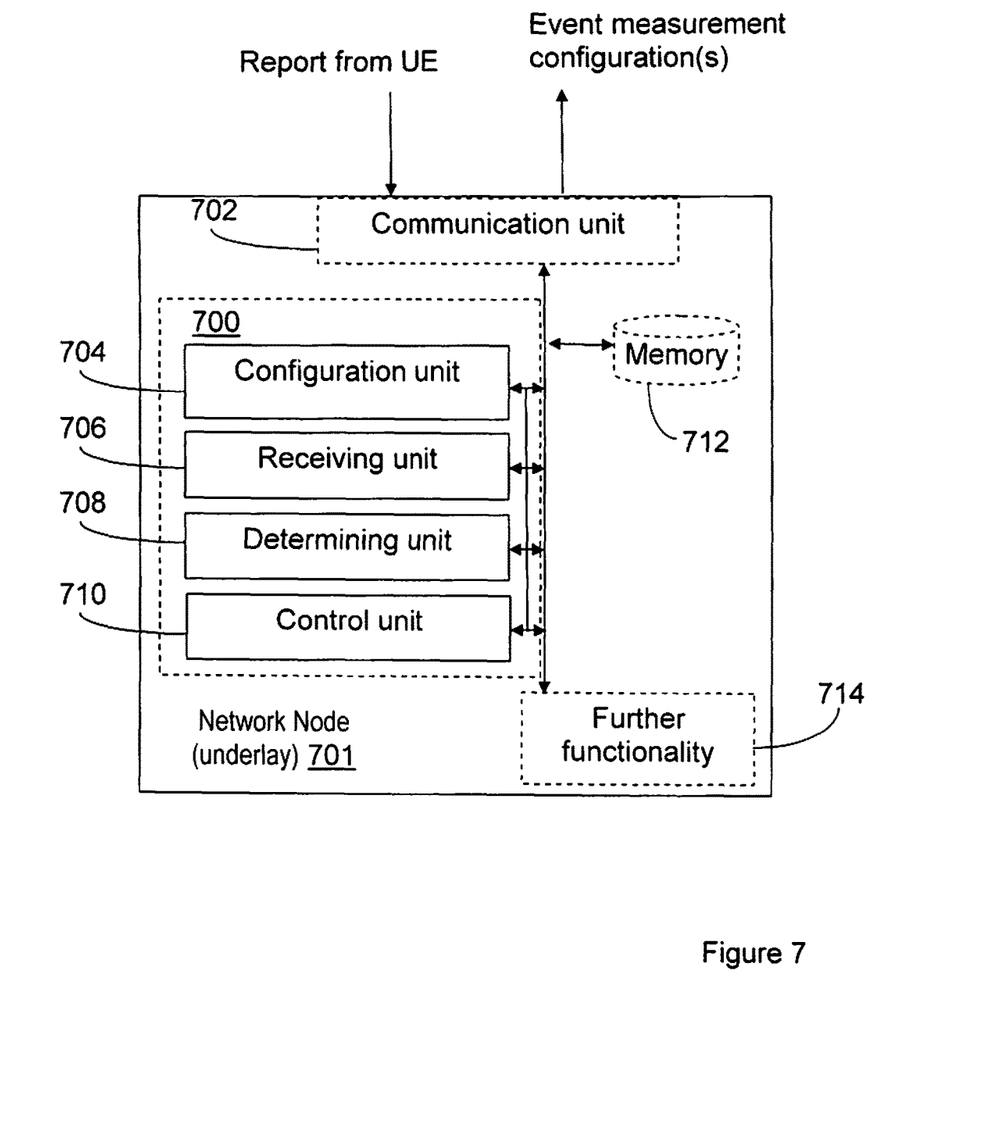
FIG. 7 is a block chart illustrating a network node (underlay), according to an exemplifying embodiment.

Exemplifying Arrangement, FIG. 7

Below, an exemplifying network node, adapted to enable the performance of the above described procedure will be described with reference to FIG. 7. The network node is operable to be associated with a cell area A and a cell extension area B (having an uplink/downlink imbalance in relation to a neighboring base station). In a preferred embodiment, the network node is operable to be a so-called underlay node to a macro node/base station.

The network node is illustrated as to communicate with other entities via a communication unit 702, which may be considered to comprise means for wireless (and possibly wired) uplink and downlink communication. The parts of the network node which are adapted to enable the performance of the above described procedure are illustrated as an arrangement 700, surrounded by a dashed line. The arrangement and/or network node may further comprise other functional units 714, for providing e.g. remaining regular node functions. The arrangement and/or network node may further comprise one or more storage units 712.

The arrangement 700 could be implemented by processing circuitry, e.g. by one or more of: a processor or a micro processor and adequate software (and storage therefore), a Programmable Logic Device (PLD) or other electronic component(s)/processing circuit(s) configured to perform the actions mentioned above in conjunction with FIG. 6.

The arrangement 700 may be implemented and/or described as follows: The arrangement 700 may comprise a configuration unit 704, adapted to signal a set of event measurement conditions to a UE served by the network node, causing the UE indicate, e.g. by sending an event measurement report, to the network node when an event measurement condition is fulfilled. The respective event measurement conditions should be related to the UE's entering or leaving the cell extension area B. The arrangement 700 comprises a receiving unit 706, which is adapted to receive a report from the UE indicating that an event measurement condition is fulfilled, which will happen when the UE enters or leaves the cell extension area B.

The network node may comprise a determining unit, 708, adapted to determine, based on the received report, whether the UE which sent the report is entering or leaving cell extension area B, and whether the UE enters or leaves from/to cell area A or not. The network node may further comprise a control unit 710, adapted to control the serving of the UE, in accordance with a determined location of the UE in relation to cell extension area B and cell area A. The serving of the UE should be controlled such that the UE is served both in the uplink and the downlink when located in cell area A; and be served only in the uplink when located in cell extension area B (and not be served when located outside both of these areas).

The receiving unit may alternatively or in addition be adapted to receive also other indications of the location of the UE in relation to cell extension area B and cell area A. At least concerning cell extension area B, such an indication could be received e.g. from a neighboring network node/base station Exemplifying Procedure in Base Station, FIG. 8

Figure 8:
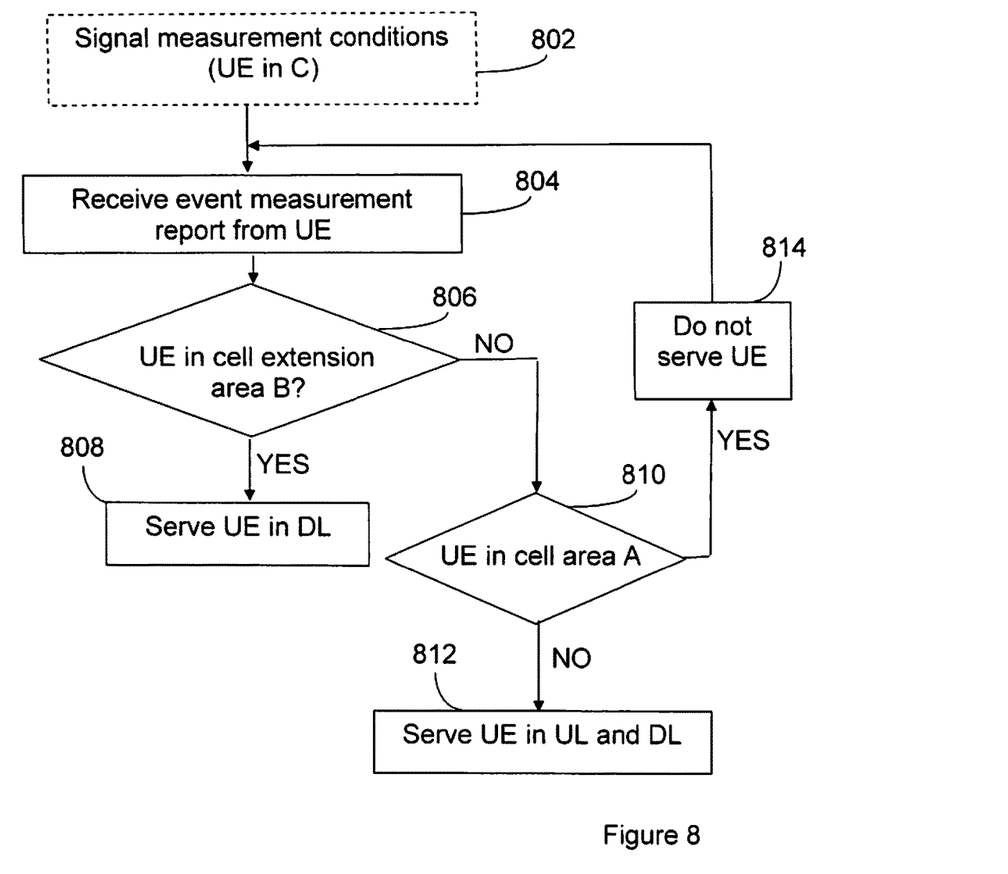
FIG. 8 is a flow chart illustrating a procedure in a macro node, according to an exemplifying embodiment.

FIG. 8 shows the actions of a procedure in a base station associated with a cell area C, having a neighboring network node associated with a cell area A, and a cell extension area B, the cell extension area B having an uplink/downlink imbalance in relation to the neighboring network node and the base station. In a specific embodiment, the base station is a macro node in relation to the neighboring network node, which is an underlay node to the base station. The neighbor network node may e.g. be a relay node associated with the base station. The base station may be e.g. an eNB in an LTE-type network.

A set of event measurement conditions may be signaled to UEs served by the base station in an action 802. The event measurement conditions should trigger an indication, such as an event measurement report, from the UE when fulfilled. An indication may be received from a UE in an action 804. Based on the indication, it is determined e.g. in actions 806 and 810, whether the UE is located in cell extension area B or in cell area A When it is determined e.g. in action 806 that the UE is located in cell extension area B, the UE is served in downlink (but not in uplink) in an action 808. This enables avoidance of interference related to communication of the UE (located in said cell extension area B). If it is determined in an action 810 that the UE is not located in cell area A (and thus is located in cell area C but outside areas A and B), the UE is served in uplink and in downlink, in an action 812. If it is determined that the UE is located in cell area A the UE should not be served by the base station, which is illustrated by an action 814 in FIG. 8. This may involve handing over the UE to the neighboring network node. For reasons of simplicity, it has been assumed in this example that the UE should be served by the base station when located outside areas A and B associated with the neighboring node.

Figure 9:
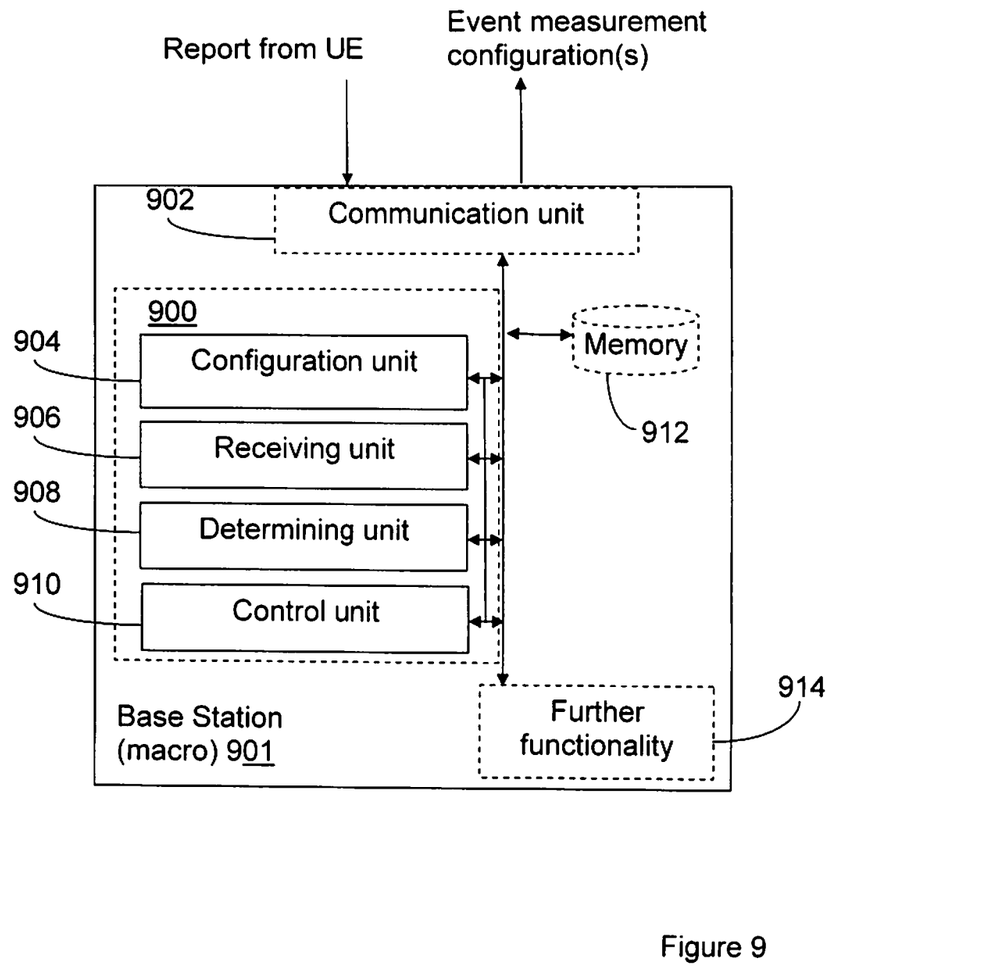
FIG. 9 is a block chart illustrating a network node (macro), according to an exemplifying embodiment.

Exemplifying Arrangement, Macro Node, FIG. 9

Below, an exemplifying base station, adapted to enable the performance of the above described procedure will be described with reference to FIG. 9. The base station is operable to serve a cell and thus be associated with a cell area C in a cellular communication system. The base station is further operable to have a neighboring network node, which is associated with a cell area A and a cell extension area B, where the cell extension area B has an uplink/downlink imbalance in relation to the neighboring network node and the base station. In a specific embodiment, the base station is operable to be a so-called macro node.

The base station is illustrated as to communicate with other entities via a communication unit 902, which may be considered to comprise means for wireless (and possibly wired) communication. The parts of the base station which are adapted to enable the performance of the above described procedure are illustrated as an arrangement 900, surrounded by a dashed line. The arrangement and/or base station may further comprise other functional units 914, for providing e.g. regular base station functions. The arrangement and/or base station may further comprise one or more storage units 912.

The arrangement 900 could be implemented by processing circuitry, e.g. by one or more of: a processor or a micro processor and adequate software (and storage therefore), a Programmable Logic Device (PLD) or other electronic component(s)/processing circuit(s) configured to perform the actions mentioned above in conjunction with FIG. 8.

The arrangement 900 may be implemented and/or described as follows: The arrangement 900 may comprise a configuration unit 904, adapted to signal a set of event measurement conditions (an event measurement configuration) to a UE served by the underlay network node, causing the UE to indicate, e.g. by sending an event measurement report, to the network node when an event measurement condition is fulfilled. The respective event measurement conditions should be related to the UE's entering or leaving the cell extension area B (extension area of neighboring cell), i.e. entering or leaving an area with uplink/downlink imbalance between the neighboring network node and the base station.

The base station may further comprise a receiving unit 906, adapted to receive an indicator, from the UE, indicating that a condition is fulfilled, as previously described. The indicator may be an event measurement report, e.g. in form of a handover request.

The base station may further comprise a determining unit, 908, adapted to determine, based on the received indicator, whether the UE which sent the report is entering or leaving cell extension area B, and whether the UE enters or leaves from/to cell area A or not. The network node may further comprise a control unit 910, adapted to control the serving of the UE, in accordance with a determined location of the UE in relation to cell extension area B and e.g. cell area A. The serving of the UE should be controlled such that the UE is served both in the uplink and the downlink when located in cell area C outside area A and B; and be served only in the downlink when located in cell extension area B (and not be served when located in cell area A). As above, for reasons of simplicity, it has been assumed in this example that the UE should be served by the base station when located outside areas A and B associated with the neighboring node.

The indicator may alternatively be, and the receiving unit thus alternatively or in addition be adapted to receive also other indications/indicators of the location of the UE in relation to cell extension area B and cell area A. At least concerning cell extension area B, such an indication could be received e.g. from a neighboring network node (underlay).

Figure 10:
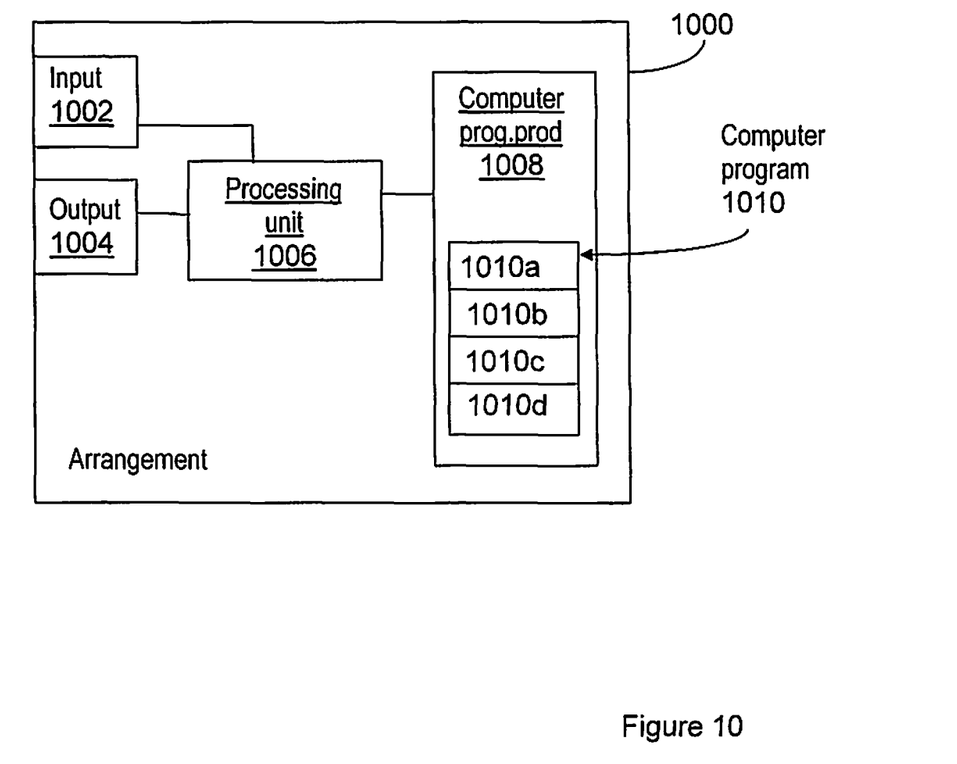
FIG. 10 is a block chart illustrating an arrangement according to an exemplifying embodiment.

FIG. 10 schematically shows a possible embodiment of an arrangement 1000, which also can be an alternative way of disclosing an embodiment of the arrangement illustrated in any of FIG. 7 or 9. Comprised in the arrangement 1000 are here a processing unit 1006, e.g. with a DSP (Digital Signal Processor). The processing unit 1006 may be a single unit or a plurality of units to perform different actions of procedures described herein. The arrangement 1000 may also comprise an input unit 1002 for receiving signals from other entities, and an output unit 1004 for providing signal(s) to other entities. The input unit 1002 and the output unit 1004 may be arranged as an integrated entity.

Furthermore, the arrangement 1000 comprises at least one computer program product 1008 in the form of a non-volatile memory, e.g. an EEPROM (Electrically Erasable Programmable Read-Only Memory), a flash memory and a hard drive. The computer program product 1008 comprises a computer program 1010, which comprises code means, which when executed in the processing unit 1006 in the arrangement 1000 causes the arrangement and/or a node in which the arrangement is comprised to perform the actions e.g. of the procedure described earlier in conjunction with FIG. 6 or 8.

The computer program 1010 may be configured as a computer program code structured in computer program modules. Hence, in an exemplifying embodiment, the code means in the computer program 1010 of the arrangement 1000 may comprise an obtaining module 1010a for signaling a measurement configuration to one or more UEs. The arrangement 1000 may further comprise a receiving module 1010b for receiving an indicator from a UE (or possibly from another network node). The computer program may further comprise a determining module 1010c for determining the location of the UE (in relation to cell extension area B) based on a received indicator. The computer program 1010 may further comprise a control module 1010d for controlling the serving of the UE based on the determined location.

The modules 1010a-d could essentially perform the actions of the flow illustrated in FIG. 6 or 8, to emulate the arrangement illustrated in FIG. 7 or 9.

Although the code means in the embodiment disclosed above in conjunction with FIG. 10 are implemented as computer program modules which when executed in the processing unit causes the decoder to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

It is to be understood that the choice of interacting units or modules, as well as the naming of the units are only for exemplifying purpose, and nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities. Although the description above contains many specificities, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

The invention claimed is:

1. A method in a network node associated with a cell area A and a cell extension area B having an uplink/downlink imbalance in relation to a neighboring base station and the network node, the method comprising:
    signaling a set of event measurement conditions to a User Equipment (UE), causing the UE to indicate to the network node when an event measurement condition in the set of event measurement conditions is fulfilled, wherein the set of event measurement conditions comprises:
        an event measurement condition related to the UE entering or leaving the cell area A, the UE being served in both uplink and downlink in the cell area A; and
        an event measurement condition related to the UE entering or leaving the cell extension area B, the UE being served in uplink in the cell extension area B;
    based on the indication, determining whether the UE is located in the cell area A or the cell extension area B, wherein the fulfilled event measurement condition defines circumstances, based on measurement values, that trigger the UE to indicate to the network node when any event measurement condition in the set of event measurement conditions is fulfilled;
    in response to a determination that the UE is located in the cell area A, serving the UE in both uplink and downlink; and
    in response to a determination that the UE is located in the cell extension area B, serving the UE in uplink.

2. The method of claim 1, further comprising determining whether the UE is located in the cell area A or the cell extension area B based on an indicator received from the UE.

3. The method of claim 2, wherein the indicator is an event measurement report.

4. The method of claim 2, wherein the indicator is a handover request.

5. The method of claim 1, further comprising determining whether the UE is located in the cell area A or the cell extension area B based on an indicator received from the neighboring base station.

6. The method of claim 1, wherein the network node operates at a lower transmit power than the neighboring base station.

7. The method of claim 1, wherein the network node is at least one of:
a relay node associated with the neighboring base station, and
an underlay node to the neighboring base station.

8. A network node operable to be associated with a cell area A and a cell extension area B having an uplink/downlink imbalance in relation to a neighboring base station and the network node, the network node comprising a communication circuitry configured to communicate with a User Equipment (UE) and further comprising a processing circuitry configured to:
signal a set of event measurement conditions to the UE, using the communication circuitry, causing the UE to indicate to the network node when an event measurement condition in the set of event measurement conditions is fulfilled, wherein the set of event measurement conditions comprises:
an event measurement condition related to the UE entering or leaving the cell area A, the UE being served in both uplink and downlink in the cell area A; and
an event measurement condition related to the UE entering or leaving the cell extension area B, the UE being served in uplink in the cell extension area B;
based on the indication, determine whether the UE is located in the cell area A or the cell extension area B, wherein the fulfilled event measurement condition defines circumstances, based on measurement values, that trigger the UE to indicate to the network node when any event measurement condition in the set of event measurement conditions is fulfilled;
in response to a determination that the UE is located in the cell area A, serve the UE in both uplink and downlink; and
in response to a determination that the UE is located in the cell extension area B, serve the UE in uplink.

9. The network node of claim 8, the processing circuitry being further configured to determine whether the UE is located in the cell area A or the cell extension area B based on an indicator received from the UE.

10. The network node of claim 9, wherein the indicator is an event measurement report.

11. The network node of claim 9, wherein the indicator is a handover request.

12. The network node of claim 8, the processing circuitry being further configured to determine whether the UE is located in the cell area A or the cell extension area B based on an indicator received from the neighboring base station.

13. The network node of claim 8, wherein the network node is configured to operate at a transmit power that is lower than the transmit power of the neighboring base station.

14. The network node of claim 8, wherein the network node is at least one of:
a relay node associated with the neighboring base station, and
an underlay node to the neighboring base station.

15. A method in a base station associated with a cell area C and having a neighboring network node being associated with a cell area A and a cell extension area B, the cell extension area B having an uplink/downlink imbalance in relation to the neighboring network node and the base station, the method comprising:
signaling a set of event measurement conditions to the UE, causing the UE to indicate to the base station when an event measurement condition in the set of event measurement conditions is fulfilled, wherein the set of event measurement conditions comprises:
an event measurement condition related to the UE entering or leaving the cell extension area B, the UE being served in downlink by the base station in the cell extension area B;
based on the indication, determining whether the UE is located in the cell area A or the cell extension area B, wherein the fulfilled event measurement condition defines circumstances, based on measurement values, that trigger the UE to indicate to the network node when any event measurement condition in the set of event measurement conditions is fulfilled; and
in response to a determination that the UE is located in the cell extension area B, serving the UE in downlink.

16. The method of claim 15, further comprising determining whether the UE is located in the cell area A or the cell extension area B based on an indicator received from the UE.

17. The method of claim 16, wherein the indicator is an event measurement report.

18. The method of claim 16, wherein the indicator is a handover request.

19. The method of claim 15, further comprising determining whether the UE is located in the cell area A or the cell extension area B based on an indicator received from the neighboring network node.

20. The method of claim 15, wherein the base station operates at a higher transmit power than the neighboring network node.

21. The method of claim 15, wherein the neighboring network node is at least one of:
a relay node associated with the base station, and
an underlay node to the base station.

22. A base station being operable to be associated with a cell area C and having a neighboring network node associated with a cell area A and a cell extension area B, the cell extension area B having an uplink/downlink imbalance in relation to the neighboring network node and the base station, the base station comprising a communication circuitry configured to communicate with a User Equipment (UE) and further comprising a processing circuitry configured to:
signal a set of event measurement conditions to the UE, using the communication circuitry, causing the UE to indicate to the base station when an event measurement condition in the set of event measurement conditions is fulfilled wherein the set of event measurement conditions comprises:
an event measurement condition related to the UE entering or leaving the cell extension area B, the UE being served in downlink by the base station in the cell extension area B;
based on the indication, determine whether the UE is located in the cell area A or the cell extension area B, wherein the fulfilled event measurement condition defines circumstances, based on measurement values, that trigger the UE to indicate to the network node when any event measurement condition in the set of event measurement conditions is fulfilled; and in response to a determination that the UE is located in the cell extension area B, serve the UE in downlink.

23. The base station of claim 22, wherein the processing circuitry is further configured to determine whether the UE is located in the cell area A or the cell extension area B based on an indicator received from the UE.

24. The base station of claim 23, wherein the indicator is an event measurement report.

25. The base station of claim 23, wherein the indicator is a handover request.

26. The base station of claim 22, wherein the processing circuitry is further configured to determine whether the UE is located in the cell area A or the cell extension area B based on an indicator received from the neighboring network node.

27. The base station of claim 22, wherein the base station is configured to operate at a transmit power that is higher than the transmit power of the neighboring network node.

28. The base station of claim 22, wherein the neighboring network node is at least one of:
   a relay node associated with the base station, and
   an underlay node to the base station.

29. A method in a cellular communication system comprising a base station associated with a cell area C and a network node associated with a cell area A and a cell extension area B, the cell extension area B having an uplink/downlink imbalance in relation to the network node and the base station, the method comprising:
   signaling a set of event measurement conditions to a User Equipment (UE), causing the UE to indicate to the network node when an event measurement condition in the set of event measurement conditions is fulfilled, wherein the set of event measurement conditions comprises:
      an event measurement condition related to the UE entering or leaving the cell area A, the UE being served in both uplink and downlink in the cell area A; and
      an event measurement condition related to the UE entering or leaving the cell extension area B, the UE being served in uplink in the cell extension area B;
   based on the indication, determining whether the UE is located in the cell area A or the cell extension area B, wherein the fulfilled event measurement condition defines circumstances, based on measurement values, that trigger the UE to indicate to the network node when any event measurement condition in the set of event measurement conditions is fulfilled;
   in response to a determination that the UE is located in the cell area A, serving the UE in both uplink and downlink by the network node;
   in response to a determination that the UE is located in the cell extension area B, serving the UE in uplink by the network node and in downlink by the base station; and
   serving the UE in both uplink and downlink by the base station when the UE is located in the cell area C outside the cell areas associated with the network node.

30. A non-transitory computer-readable medium comprising, stored thereupon, a computer program comprising computer readable code means that, when executed by at least one processor in a network node associated with a cell area A and a cell extension area B having an uplink/downlink imbalance in relation to a neighboring base station and the network node, causes the network node to:
   signal a set of event measurement conditions to a User Equipment (UE), causing the UE to indicate to the network node when an event measurement condition in the set of event measurement conditions is fulfilled, wherein the set of event measurement conditions comprises:
      an event measurement condition related to the UE entering or leaving the cell area A, the UE being served in both uplink and downlink in the cell area A; and
      an event measurement condition related to the UE entering or leaving the cell extension area B, the UE being served in uplink in the cell extension area B;
   based on the indication, determine whether the UE is located in the cell area A or the cell extension area B, wherein the fulfilled event measurement condition defines circumstances, based on measurement values, that trigger the UE to indicate to the network node when any event measurement condition in the set of event measurement conditions is fulfilled;
   in response to a determination that the UE is located in the cell area A, serve the UE in both uplink and downlink; and
   in response to a determination that the UE is located in the cell extension area B, serve the UE in uplink.

* * * * *